Patented Mar. 29, 1932

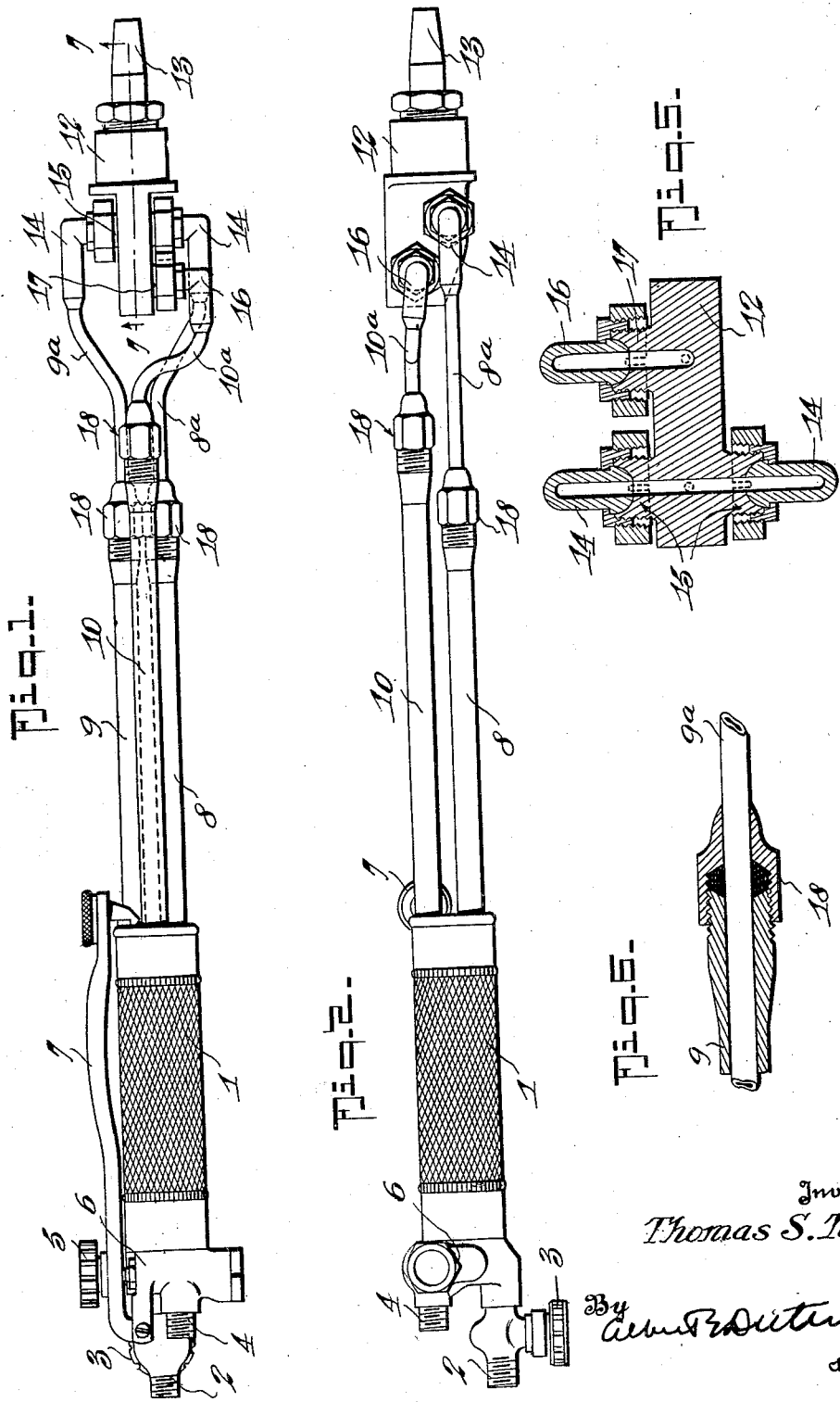

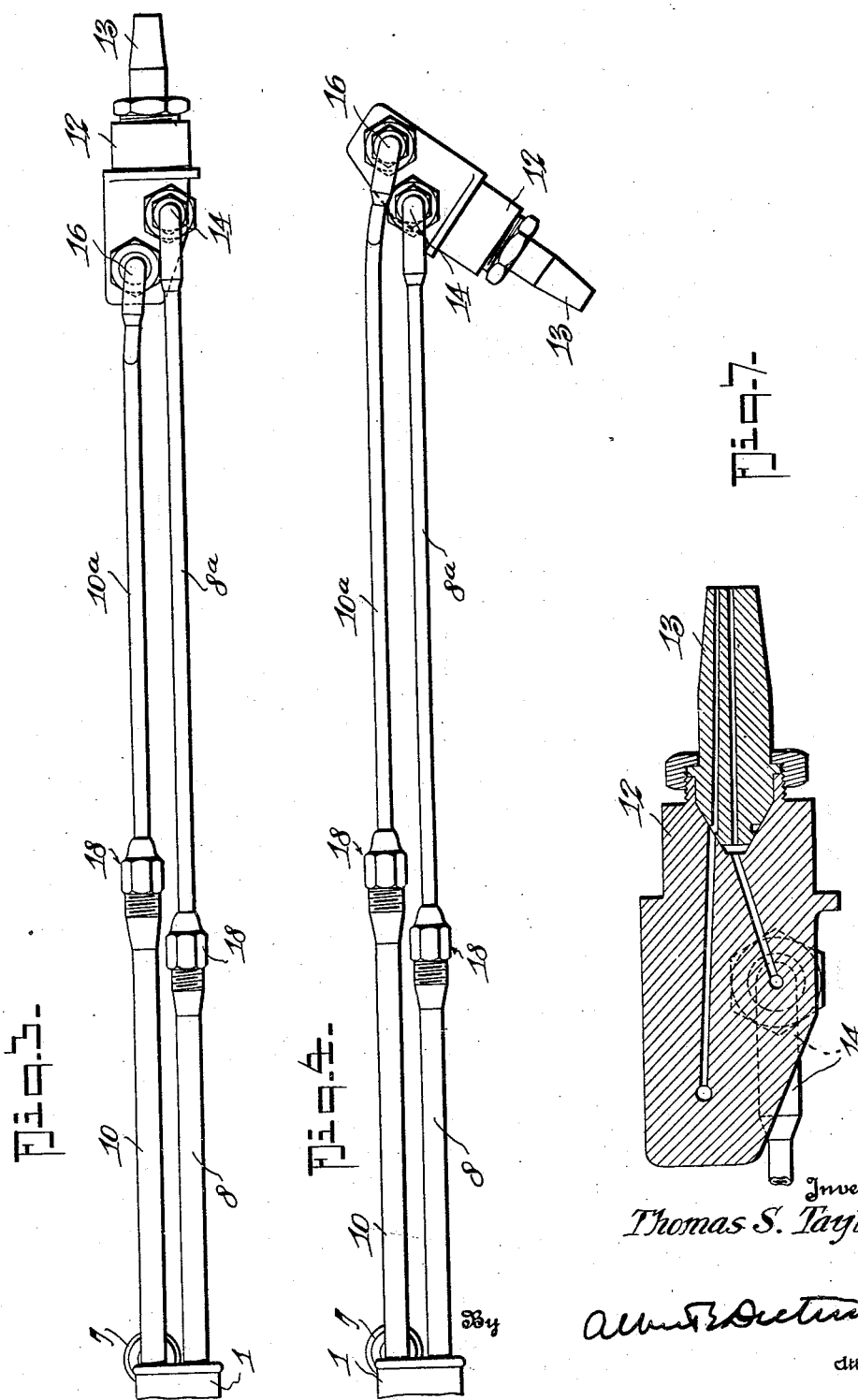

1,851,377

UNITED STATES PATENT OFFICE

THOMAS SAMUEL TAYLOR, OF BARTONVILLE, ONTARIO, CANADA

SAFETY ADJUSTABLE CUTTING TORCH

Application filed May 14, 1931. Serial No. 537,430.

My invention relates to cutting torches used for various purposes where parts are to be cut out by burning away a portion thereof, and it particularly has for its object to improve torches of the type disclosed generally in United States Letters Patent to Wright, No. 1,060,393, issued April 29, 1913.

Primarily the invention has for its object to provide a torch which, while having an angularly adjustable head, is also provided with extensible tubing whereby the head may be located farther from or closer to the handle as conditions may make necessary for reaching to out of the way places or to enable the operator to keep back of the heat zone when the heat becomes too intense for his comfort.

Further, it is an object of the invention to provide a torch of an extensible nature, whose nozzle may be placed at any angle desired and secured in that position by the same means which holds the extensible sections in their adjusted positions.

Further, it is an object of the invention to provide an extensible torch having an angularly adjustable nozzle of a simple and inexpensive structure in which the point of the nozzle may be set at the desired angle at the same time the torch is extended and the nozzle held in its angularly placed position by virtue of its connection with the group of gas pipes that conduct the combustible gas and the gas which supports combustion from the handle to the nozzle, and in virtue of the means which maintains the extensible sections in flexible or rigid relation to one another once the adjustment has been made.

Further, it is an object to provide an extensible torch with an adjustable nozzle so constructed that when the torch has once been extended to bring the nozzle to the place where the flame is to be applied the angularity of the nozzle may be adjusted by the operator from adjacent the handle so that he can direct the nozzle in the most convenient manner to the work.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 1 is a plan of a torch embodying the invention.

Figure 2 is a side elvation of the same in its contracted adjustment with the nozzle straight ahead.

Figure 3 is a side elevation of the torch with the torch extended part way and the nozzle straight.

Figure 4 is a view similar to Figure 3 showing the nozzle adjusted to an angle to the axis of the torch as a whole.

Figure 5 is a detail section showing the coupling connection between the pipes and the nozzle head.

Figure 6 is a detail section of the packed friction nut coupling between the pipe sections for binding them in their adjusted relations and preventing leakage of gas as well as to hold the nozzle in its angularly adjusted position.

Figure 7 is a horizontal section on the line 7—7 of Figure 1 looking in the direction of the arrow.

In the drawings, in which like numerals of reference indicate like parts in all of the figures, 1 represents the handle, 2 the acetylene intake, 3 the acetylene regulating valve for the flame, 4 the oxygen intake, 5 the oxygen regulating valve for the flame, 6 the oxygen control valve, and 7 the control valve operating lever. All of these parts may be of the usual construction and per se are not of my invention.

8—8a designate the acetylene duct from the handle to the nozzle, 9—9a the oxygen duct from the handle to the nozzle, and 10—10a the other oxygen duct from the handle to the nozzle. The duct 8—8a is controlled by the valve 3, the duct 9—9a by the valve 5 and the duct 10—10a by the valve 6.

These ducts are composed of two or more telescopic sections secured together by packed friction couplings 18 so that the sections may be telescoped together when the coupling is loosened or extended more or less and thereafter held in position by tightening the coupling.

The nozzle head 12 carries the usual tip 13 and is mounted on the elbows 14 of the ducts 8a and 9a so as to have pivotal movement on a transverse axis. For this purpose the nozzle has threaded co-axial bosses 15 similar in construction to those shown in Figure 4 of the Wright patent aforesaid, or any suitable trunnion-like or swivel connection may be used.

16 is an elbow at the end of the duct 10a which is similarly connected to the threaded boss 17, the latter being off-set to the rear from the bosses 15 so as to be eccentric thereto.

It should be understood that the number of telescopic sections of pipe constituting the ducts 8—8a, 9—9a and 10—10a may be varied to suit requirements. For convenience of illustration only two sections have been shown in the drawings.

The torch is so made that all joints are flexible and gas-tight so as to enable the operator to change the length of the torch or the angle of the head while in actual use. Of course, the joints can be made rigid by tightening up the adjusting nuts. However, in practice, this is usually unnecessary. All joints being gas-tight and flexible the torch can be lengthened or shortened or the angle of the head changed without the use of wrenches or other tools while in actual use.

The particular arrangement of the control valves, handle, nozzle and ducts for carrying the acetylene and oxygen may be of any approved type, save that the ducts are made telescopic and connected to the nozzle head in the manner illustrated and described for the purposes specified.

From the foregoing description, taken in connection with the accompanying drawings, it is thought the complete construction, operation and advantages of my invention will be clear to those skilled in the art to which it relates.

What I claim is:

1. In torches, the combination with a handle having the usual valved inlets for the combustible gas and the supporter of combustion, and a nozzle, combined with a plurality of telescopic ducts leading from the handle to the nozzle, and means pivotally connecting said nozzle to a pair of said ducts on a common axis, and means pivotally connecting another of said ducts to said nozzle on an axis off-set to said common axis whereby the nozzle may be set at any of a series of angles, and means holding the telescopic sections of the ducts in gas-tight relation to one another.

2. In torches, the combination with a handle having the usual valved inlets for the combustible gas and the supporter of combustion, and a nozzle; combined with a plurality of telescopic ducts leading from the handle to the nozzle, means pivotally connecting said nozzle to a pair of said ducts on a common axis, means connecting another of said ducts to said nozzle on an axis parallel to the common axis but off-set therefrom whereby with said pair of ducts held against telescopic movement the third duct may be moved telescopically and thereby angularly adjust the nozzle, and means for holding the telescopic sections of the ducts in gas-tight relation.

3. In torches having a handle, a nozzle head and a nozzle carried by said head, combined with a plurality of gas pipes connecting said handle with said head and pivotally connected to said head on two parallel axes, said pipes each being composed of telescopic sections, and means holding the sections of each pipe in gas-tight relation to one another.

4. In torches having a handle, a nozzle head and a nozzle carried by said head, combined with a plurality of gas pipes connecting said handle with said head and pivotally connected to said head on two parallel axes, said pipes each being composed of telescopic sections, and means holding the sections of each pipe in gas-tight relation to one another, said means comprising packed couplings secured to the ends of one pipe section and slidable on the next adjacent pipe section.

THOMAS SAMUEL TAYLOR.